United States Patent
Hagh et al.

(10) Patent No.: US 8,961,881 B2
(45) Date of Patent: Feb. 24, 2015

(54) MULTI-STAGE CATALYTIC AIR PURIFICATION SYSTEM

(75) Inventors: Bijan Hagh, Newport Beach, CA (US); Mahmoud Adel Elsayed, Yorba Linda, CA (US); Russell W. Johnson, Elmhurst, IL (US); Peter M. Michalakos, Arlington Heights, IL (US); Melissa Dopkins, Chicago, IL (US)

(73) Assignee: Honeywell International Inc., Morristown, NJ (US)

(*) Notice: Subject to any disclaimer, the term of this patent is extended or adjusted under 35 U.S.C. 154(b) by 811 days.

(21) Appl. No.: 12/426,029

(22) Filed: Apr. 17, 2009

(65) Prior Publication Data
US 2009/0232718 A1    Sep. 17, 2009

Related U.S. Application Data

(63) Continuation-in-part of application No. 11/736,069, filed on Apr. 17, 2007, now abandoned.

(60) Provisional application No. 61/060,766, filed on Jun. 11, 2008.

(51) Int. Cl.
*B01D 53/86* (2006.01)
*B01D 53/94* (2006.01)

(52) U.S. Cl.
CPC ........ *B01D 53/8625* (2013.01); *B01D 53/869* (2013.01); *B01D 53/8696* (2013.01); *B01D 53/9477* (2013.01); *B01D 2255/1021* (2013.01); *B01D 2257/404* (2013.01); *B01D 2257/408* (2013.01); *B01D 2259/40* (2013.01); *B01D 2259/4575* (2013.01); *B01D 2259/4583* (2013.01); *Y02C 20/10* (2013.01)
USPC ............................................. 422/122; 210/660

(58) Field of Classification Search
USPC ...................... 422/122; 204/660, 672, 674
See application file for complete search history.

(56) References Cited

U.S. PATENT DOCUMENTS

| | | | |
|---|---|---|---|
| 4,551,304 A * | 11/1985 | Holter et al. ................. 422/4 |
| 5,110,569 A | 5/1992 | Jain |
| 5,538,698 A | 7/1996 | Abe |
| 6,185,932 B1 | 2/2001 | Park |
| 6,280,691 B1 | 8/2001 | Homeyer |
| 6,855,297 B2 | 2/2005 | Van Den Bussche |
| 6,962,629 B2 | 11/2005 | Johnson |
| 7,132,086 B2 * | 11/2006 | Michalakos et al. ........ 422/169 |
| 7,179,429 B1 | 2/2007 | Maus |
| 7,374,728 B2 | 5/2008 | Nakanishi |
| 7,473,402 B2 * | 1/2009 | Michalakos et al. ........ 422/129 |
| 2003/0017090 A1 * | 1/2003 | Michalakos et al. ........ 422/177 |
| 2004/0103669 A1 * | 6/2004 | Willis et al. ................. 60/777 |
| 2005/0214186 A1 * | 9/2005 | Michalakos et al. ........ 423/219 |
| 2008/0170971 A1 | 7/2008 | Bergeron |
| 2008/0260575 A1 | 10/2008 | Johnson |
| 2008/0314029 A1 | 12/2008 | Okugawa |

* cited by examiner

*Primary Examiner* — Timothy Cleveland
(74) *Attorney, Agent, or Firm* — Shimokaji & Assoc., P.C.

(57) ABSTRACT

Apparatus and methods for the production of a secure supply of breathable air are important under conditions where threats from chemical and biological weapons may be present. A method and a multi-stage CATOX system for producing a purified air flow from ambient air which may have nitrogen containing toxicants is provided. The multi-stage CATOX system has a first stage and second stage, at least one of the first or the second stage has a first catalytic heat exchanger with a cold side supporting a first catalyst and a hot side configured to transfer heat therefrom to the first catalyst.

6 Claims, 5 Drawing Sheets

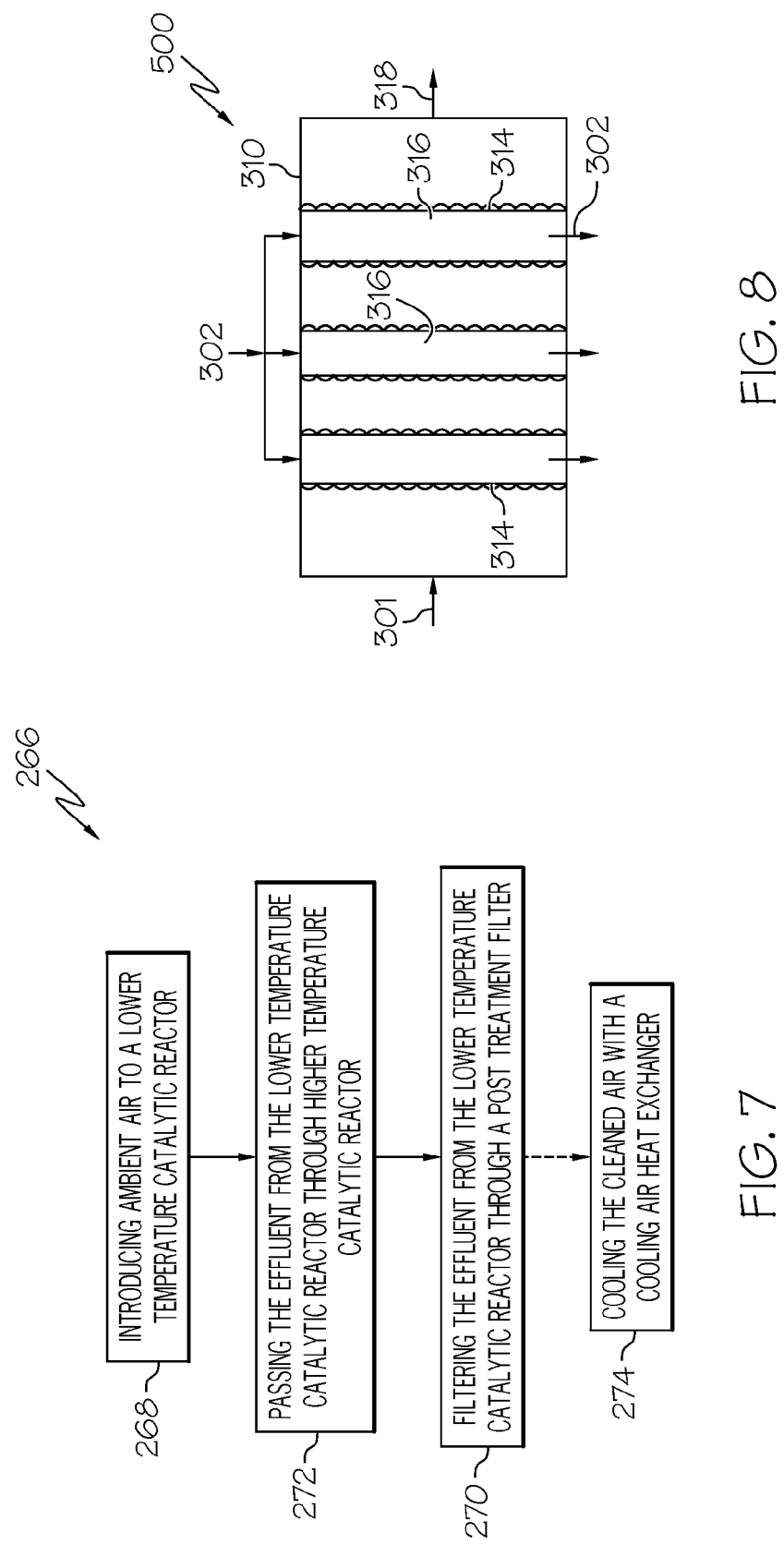

MULTI-STAGE CATALYTIC AIR PURIFICATION SYSTEM

RELATED APPLICATIONS

The present application claims benefit of U.S. Provisional Application No. 61/060,766, filed Jun. 11, 2008. This application is a continuation-in-part of prior application Ser. No. 11/736,069, filed Apr. 17, 2007.

BACKGROUND OF THE INVENTION

The present invention generally relates to environmental control systems and, more specifically, to a multi-stage catalytic control system and method for providing a supply of breathable air under conditions where chemical and biological toxic compounds may be present in the ambient air.

In certain applications, it may be highly desirable to remove chemical and biological toxic compounds from the air. Catalysts may be used to destroy certain toxic compounds in an air stream. In order for air to be breathable, by-products of the destruction of toxic compounds must be removed. For example, nitrogen oxides ($NO_x$) produced from the destruction of nitrogen containing compounds must be removed, typically through the use of a $NO_x$ post-treatment filter (PTF). Conventional methods heat the air to a high temperature, typically about 300° C., that is provided to the catalyst. This high temperature oxidation of the ambient air may result in a high percentage of the nitrogen containing compounds to be oxidized into $NO_x$. As a result, either large PTF assemblies are required or PTF assemblies need to be replaced often, to adequately remove toxins from an air stream in order to produce breathable air.

A Catalytic Oxidation (CATOX) system 10 in the prior art technology is shown in FIG. 1. Referring to FIG. 1, CATOX System 10 consists of individualized elements. Ambient air may be supplied to a lower temperature heat exchanger or recuperator 12 via a line 14. The lower temperature heat exchanger 12 may be used to heat the incoming ambient air through line 14 with energy in the treated air exiting the post treatment filter 22. High temperature blower 16 moves the ambient air through line 14, low temperature heat exchanger 12 and into heater 18. Heater 18 further heats the ambient air to about 300° C. and is then introduced into an oxidation catalyst 20 where certain toxic compounds may be oxidized. The effluent from the catalytic oxidation catalyst 20 is then passed through post treatment filter 22 where some un-oxidizable compounds in the ambient air and acid gases or $NO_x$, produced in the oxidation catalyst 20, may be destroyed or removed. The treated ambient air exiting post treatment filter 22 may then be passed through the hot side of low temperature heat exchanger 12 to preheat the ambient air entering through line 14.

As can be seen, there is a need for an apparatus and methods for the destruction of chemical and biological impurities from an air stream to yield a source of breathable air. Furthermore, there is a need for such an apparatus to oxidize nitrogen containing compounds while reducing the production of $NO_x$ and a need for such an apparatus to be suitable for mobile platforms.

SUMMARY OF THE INVENTION

In one aspect of the present invention, a multi-stage CATOX system comprises a first catalytic reactor comprising a first catalyst configured to oxidize toxicants that include nitrogen-containing toxicants at a first temperature; a second catalytic reactor comprising a second catalyst configured to oxidize toxicants in an effluent from the first catalytic reactor at a second temperature; and at least one of the first catalytic reactor and the second catalytic reactor comprises a catalyzed heat exchanger configured to heat the first or the second catalyst.

In another aspect of the present invention, a multi-stage CATOX system for producing a purified air flow from ambient air comprising nitrogen containing toxicants comprises a first stage and second stage, at least one of the first or the second stage comprises a first catalytic heat exchanger comprising: a cold side supporting a first catalyst; and a hot side configured to transfer heat therefrom to the first catalyst.

In a further aspect of the present invention, a method for producing a purified air flow from ambient air comprising toxicants comprises the steps of: contacting the ambient air with a first catalyst; oxidizing a first portion of the toxicants in the ambient air with the first catalyst operated at a first temperature to provide a first effluent; contacting the first effluent with a second catalyst; oxidizing a second portion of the toxicants in the ambient air with the second catalyst operated at a second temperature to provide a second effluent, the first temperature being lower than the second temperature; heating at least one of the first catalyst and the second catalyst; the step of heating of the first catalyst being performed at the same time as the step of oxidizing a first portion of the toxicants in the ambient air; and the step of heating of the second catalyst being performed at the same time as the step of oxidizing a second portion of the toxicants in the ambient air.

These and other features, aspects and advantages of the present invention will become better understood with reference to the following drawings, description and claims.

BRIEF DESCRIPTION OF THE DRAWINGS

FIG. 7 is a flow chart describing a method according to one embodiment of the present invention; and FIG. 8 shows a catalyzed heat exchanger according to one embodiment of the present invention.

DETAILED DESCRIPTION OF THE INVENTION

Figure 1:
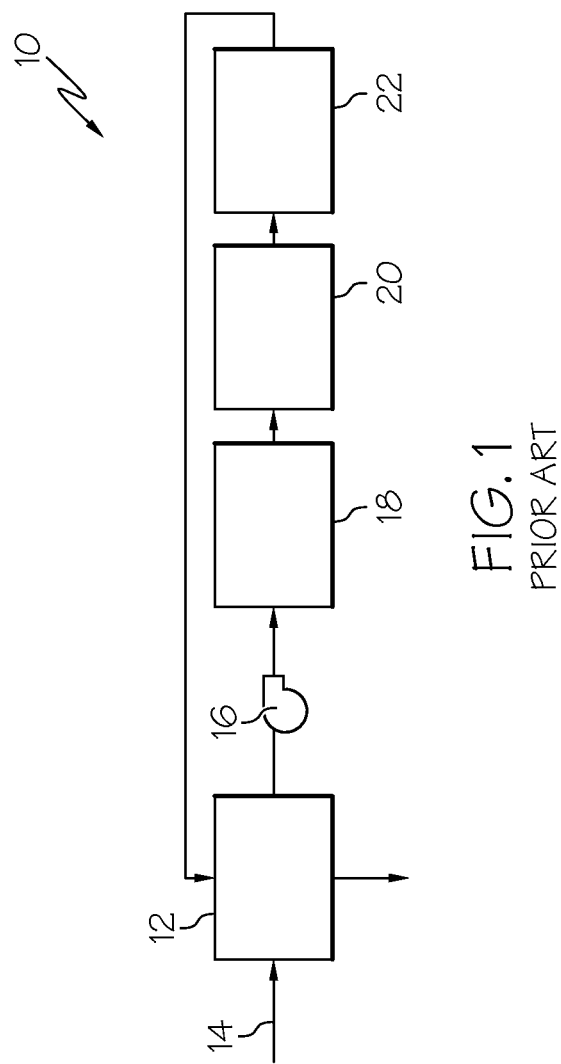
FIG. 1 is a schematic drawing showing the prior art CATOX system baseline technology.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention generally provide methods and apparatuses for ensuring a supply of breathable air under conditions where threats from chemical and biological constituents in the ambient may be present. The catalytic oxidation (CATOX) system may be comprised of at least two primary elements: (1) a first catalyst operating at a first temperature configured for oxidizing nitrogen containing compounds while producing low amounts of $NO_x$ or acid gases, and (2) a second catalyst operating at a second temperature configured for oxidizing contaminants in the effluent of the first catalyst. A post treatment filter (PTF, also known as a post treatment adsorbent (PTA)) may also be incorporated in the apparatus for the remove acidic gases that may be produced by reaction over the first or second catalyst and acidic gases that are not oxidized in the first and second catalyst.

Other chemical and biological constituents which may be present in the ambient air may also be oxidized in the first and second catalysts. The first and second catalysts may be operated in a two-stage manner, each operating at an independent temperature. The operating temperature and composition of the first catalyst may be such that a significant amount of nitrogen compounds may be oxidized into breathable constituents, such as $N_2$ and $N_2O$, rather than noxious constituents, such as $NO_x$. This may reduce the requirement for removal of noxious constituents with a PTF. The second catalyst operating temperature and composition may be such that a significant amount of other chemical compounds or biological constituents may be oxidized into breathable constituents. The higher temperature in the second catalyst operating at a higher temperature will also ensure that a very high-level of destruction of the nitrogen-containing toxicants will be achieved.

The heaters and/or recuperators may be incorporated into the CATOX systems to reduce weight, volume, and/or startup time. Large CATOX systems may not be suitable in situations where there may be confined space and reduced weight requirements. Conventional methods may consist of individualized elements which may introduce additional weight volume, and startup times that may be unsuitable for mobile platforms. In an aspect of the present invention, a catalyst may be placed onto the surface of the cold side of a low temperature heat exchanger, reducing weight and size. Therefore, the CATOX system of the present invention may be useful in any enclosed environment where a secure supply of breathable air is required. For example, the CATOX system of the present invention may be useful in vehicles, such as tanks, airplanes, helicopters, trains, ships and the like, and buildings, such as office buildings, factories, shelters and the like.

Figure 2:
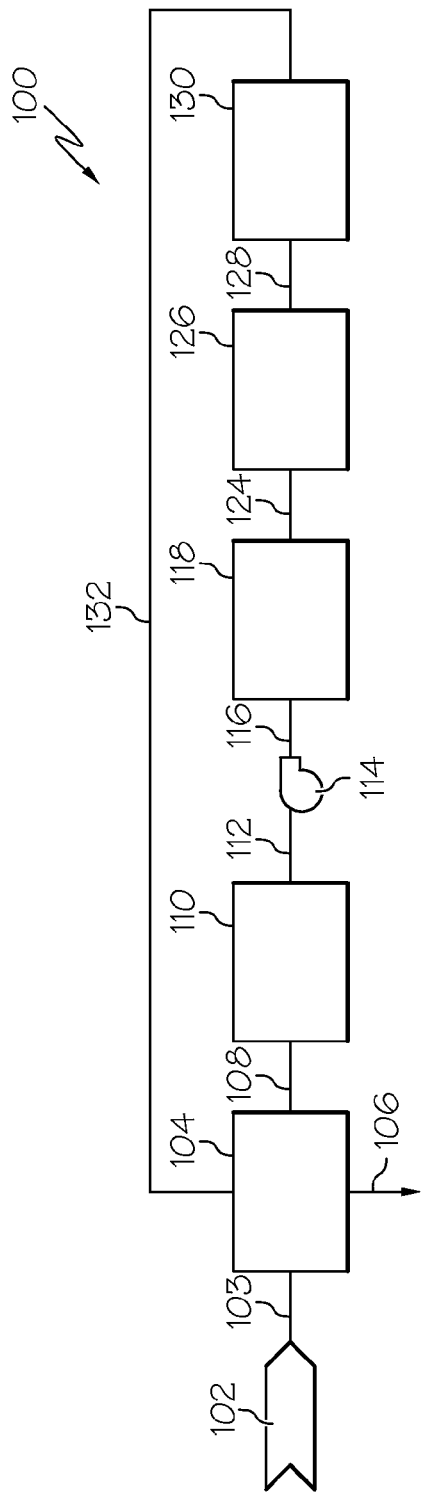
FIG. 2 is a schematic drawing showing a multi-stage CATOX system according to an embodiment of the present invention.

Referring to FIG. 2, there is shown one example of a CATOX assembly 100 according to the present invention. Ambient air 102 may be supplied to a lower temperature heat exchanger or recuperator 104 via a line 103. The heat contained in the air in stream 132 can be used to heat the incoming air in stream 102 using recuperator 104 to a temperature that is lower than the temperature ultimately found in the second catalytic reactor 126. In this manner, the incoming ambient air 102 can utilize energy that may include, for example, one or more of the following sources: recuperation from catalytic reactors 110, 126 (as shown in FIGS. 2-5), electrical, fuel combustion or exhaust heat.

Heated air may pass through line 108 into the first (lower temperature) catalytic reactor 110 which may comprise a first catalytic composition or first catalyst configured to oxidize or decompose nitrogen containing compounds at a relatively lower temperature. The first catalyst may be any of the various known catalytic compositions that may be used to oxidize toxic compounds, such as those disclosed in U.S. Pat. Nos. 5,292,704, 5,720,931, 6,503,462 and 7,132,086, each of which is hereby incorporated by reference. Alternatively, the first catalyst may be specifically designed to oxidize nitrogen compounds, at a lower temperature, into products of reaction having low amounts of $NO_x$ or acid gas.

A significant percentage of toxicant materials may be destroyed in the lower temperature catalytic reactor 110. For example, greater than 50%, and often greater than 90% of toxicant materials may be destroyed in the lower temperature catalytic reactor 110. These toxicant materials may include nitrogen containing compounds.

The lower temperature catalytic reactor 110 may operate at a sufficiently lower temperature to generate a very low yield of nitric oxide and nitrogen dioxide from nitrogen-containing organic material and cyano-inorganic materials. For example, the lower temperature catalytic reactor 110 may operate at a temperature between about 100° C. and about 300° C., often between about 150° C. and about 290° C. In one aspect, an advantageous operating temperature is between about 200° C. and 240° C., and most advantageously about 220° C. In one embodiment, at least 90% of the nitrogen containing toxicants in the ambient air are oxidized and the effluent therefrom comprises at most 10% of the oxidized nitrogen containing toxicants as acid gas The effluent from the lower temperature catalytic reactor 110 may be conducted through a line 112, with a high temperature blower 114, and forced through line 116 to a heater or heat exchanger 118. Blower 114 may be incorporated anywhere in CATOX system 100 to provide the flow through of ambient air 102 through the components of CATOX system 100 acting on ambient air 102. Heater or heat exchanger 118 heats the effluent from reactor 110 to a higher temperature. Higher temperature heat exchanger or heater 118 may raise the temperature of the effluent of lower temperature catalytic reactor 110 in line 116. Similar to the lower temperature heat exchanger or heater 104, the higher temperature heater or heat exchanger 118 may be a used to heat the effluent in line 116 with energy that may include, for example, one or more of the following sources: recuperation from catalytic reactors 110, 126, electrical, fuel combustion or exhaust heat.

The heated effluent from the higher temperature heat exchanger 118 may pass through a line 124 to a higher temperature catalytic reactor 126 which may be a vessel comprising a catalytic composition or a second catalyst. The second catalyst, in the higher temperature reactor 126, may be the same or different from the first catalyst in the lower temperature catalytic reactor 110. In both cases, the first and second catalytic compositions may be capable of destroying toxic chemicals by oxidation.

The temperature of the heated effluent in line 124 being delivered to the higher temperature catalytic reactor 126, comprising a second catalyst, may be higher than the temperature of the heated air in line 103 being delivered to the lower temperature catalytic reactor 110. For example, the higher temperature catalytic reactor 126 may operate at a temperature from about 200° C. to about 500° C., often between about 280° C. and about 320° C. Advantageously, catalytic reactor 126 operates at a temperature of at least about 300° C. The higher temperature catalytic reactor 126 may have a sufficiently higher temperature such that at least about 99.9999% of toxic compounds entering through line 103 may be destroyed or oxidized. The combination of catalytic reactors 104 and 126, operating at different temperatures, may provide treated gas or air with minimal $NO_x$ or acid gas therein.

The higher temperature catalytic reactor 126 may be followed by a post treatment filter (PTF) 130, which is designed to remove acid gas components such as but not limited to hydrochloric acid, hydrofluoric acid, nitrogen oxides, and sulfur oxides. Effluent from reactor 126 may pass through line 128 to PTF 130. PTF 130 may operate at a temperature proximate reactor 126, or at a temperature lower or higher than reactor 126. PTF 130 may be configured to remove acidic gases that may include nitric oxide and nitrogen dioxide ($NO_x$). The formulation for the PTF 130 may be similar to the formulation disclosed in U.S. Pat. No. 7,132,086, incorporated herein by reference. However, the formulation is not so limited. Other formulations may be used, such as those disclosed by Shimada et al. in European Patent Application No. 0 625 368 A1, for example. Additionally or alternatively, a platinum impregnated post treatment adsorbent (not shown) may be used in the PTF 130. PTF 130 may have both catalytic activity for destroying toxicants and adsorption capacity for removing acidic gases. The multi-stage oxidation system of embodiments of the present invention may produce an effluent having low amounts of acid gas. This may reduce the size and/or the change out requirements of a PTF assembly. This in turn may reduce CATOX system size, down time, and maintenance requirements.

The effluent from the PTF 130 may pass through a line 132 to the lower temperature heat exchanger or recuperator 104, where heat may be recuperated before discharging the clean air through line 106. Unlike single reactor stage systems, which may operate a catalytic reactor at a single temperature or in an adiabatic manner, the CATOX assembly 100 may destroy toxicants at a first, lower temperature (e.g., the temperature of the heated air in line 108) with minimal generation of acid gases. Then, at a second, higher temperature (e.g., the temperature of the effluent in line 124), the CATOX assembly 100 may destroy a substantial portion of the remaining toxicants with second catalytic reactor 126. The PTF 130, downstream of second catalytic reactor 126, may then need to remove a smaller quantity of acid gases and therefore a reduced system size or increase time of breakthrough of $NO_x$ through PTF 130 may be realized.

Figure 3:
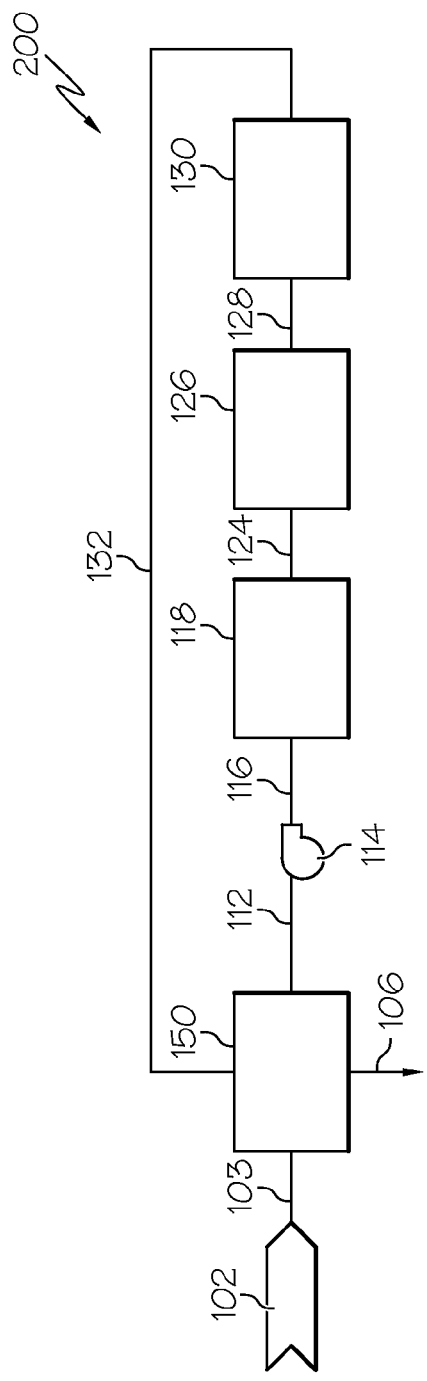
FIG. 3 is a schematic drawing showing a multi-stage CATOX system, according to an alternate embodiment of the present invention, where the first stage is a catalyzed heat exchanger.

Referring now to FIG. 3, there is shown a CATOX assembly 200 according to an alternate embodiment of the present invention. The CATOX assembly 200 may use similar equipment as the CATOX assembly 100 of FIG. 2 with the addition of catalyzed recuperator 150. After treatment with the PTF 130 (as described above with reference to FIG. 2), the treated air may pass through line 132 to the lower temperature catalyzed recuperator 150, where heat may be recuperated from gas passing through PTF 130 before discharging the clean air through line 106. Catalyzed recuperator 150 may have a first catalyst contacting ambient air 102 flowing from line 103, the first catalyst may be in heat communication with treated air flowing from line 132. In this aspect, catalyzed recuperator 150 may heat and oxidize ambient air 102 entering through line 103 and may cool treated air exiting PTF 130 through line 132 to provide cooler clean air 106. For example, catalyzed recuperator 150 may be a shell and tube heat exchanger having the first catalyst on the side of the tube(s) having ambient air 102 passing thereby and the treated air passing through line 132 contacting the other side of the tube(s). Catalyzed recuperator or heat exchanger 150 may be wash coated with the first catalyst on the cold-side and may have heat introduced thereto by a heater, such as an electrical heater or gas fired heater, in addition to or instead of heat transferred from gas passing through PTF 130.

Figure 4:
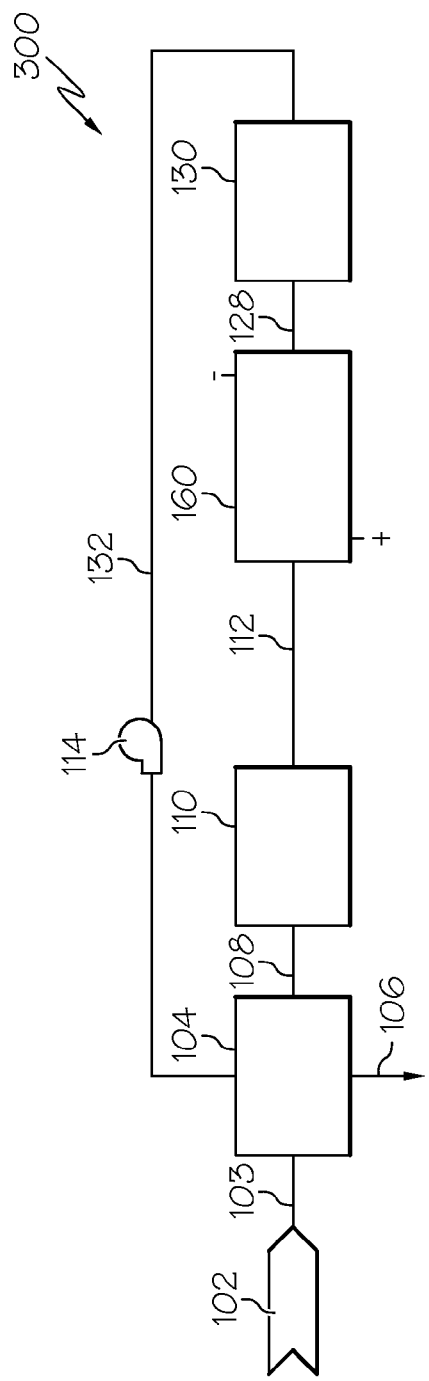
FIG. 4 is a schematic drawing showing a multi-stage CATOX system, according to an alternate embodiment of the present invention, where the second stage is a catalyzed heat exchanger.

Referring now to FIG. 4, there is shown a CATOX assembly 300 according to an alternate embodiment of the present invention. The CATOX assembly 300 may use similar equipment as the CATOX assembly 100 of FIG. 2 with the addition of catalyzed heater 160. After treatment with the first catalytic reactor 110 (as described above with reference to FIG. 2), the effluent may pass through line 112 to the higher temperature catalyzed heater 160. Catalyzed heater 160 may have a second catalyst contacting the effluent from catalytic reactor 110 passing through line 112. The second catalyst may be in heat communication with heat produced in or transferred to catalyzed heater 160. In this aspect, catalyzed heater 160 heats and oxidizes the effluent from catalytic reactor 110 entering through line 112. Catalyzed heater 160 may comprise an electric or gas fired heater configured to heat the second catalyst to a second temperature. For example, the second catalytic composition may generate heat with the resistance of an electrical current being passed therethrough. Catalyzed recuperator or heat exchanger 160 may be wash coated with the second catalyst on the cold-side and may have heat introduced thereto by a heater, such as an electrical heater or gas fired heater, in addition to or instead of heat transferred from gas passing through PTF 130.

Additionally, aspects of the invention may have high temperature blower 114 with an inlet configured to receive treated air from PTF 130 through line 132 and an outlet delivering treated air to recuperator 104. In this aspect, the pressure of the treated air in recuperator 104 may be higher than the ambient air being introduced through line 103. In the event of a leak within recuperator 104, treated air may flow to the ambient air, reducing the potential for toxicants in clean air 106.

Figure 5:
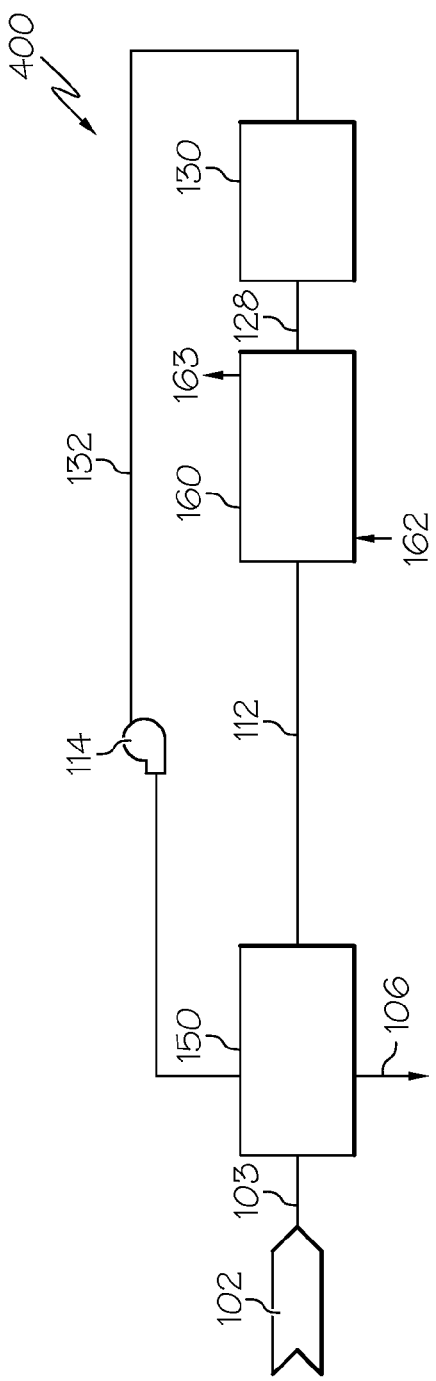
FIG. 5 is a schematic drawing showing a multi-stage CATOX system, according to an alternate embodiment of the present invention, where the first and second stages are catalyzed heat exchangers.

Referring now to FIG. 5, there is shown a CATOX assembly 400 according to an alternate embodiment of the present invention. The CATOX assembly 400 may use similar equipment as the CATOX assembly 100 of FIG. 2, CATOX assembly 200 of FIG. 3, and CATOX assembly 300 of FIG. 4. CATOX assembly 400 may have catalyzed recuperator 150, as CATOX assembly 200 of FIG. 3, and catalyzed heater 160, as the CATOX assembly 300 of FIG. 4. Additionally, this aspect of the invention may have high temperature blower 114 with an inlet configured to receive treated air from PTF 130 through line 132 and an outlet delivering treated air to recuperator 104, as CATOX assembly 200 of FIG. 3 and CATOX assembly 300 of FIG. 4. Further, this aspect of the invention shows an example of a gas fired catalyzed heater 160 wherein fuel enters through inlet 162 and products of combustion exit through line 163.

While the above FIGS. 1-5 describe embodiments of the present invention, such embodiments should only be seen as exemplary embodiments and are not meant to limit the scope of the present invention. Broadly, an embodiment of the present invention may be drawn to a two stage CATOX apparatus and process, wherein a first stage oxidizes components in an air stream at a first temperature and a second stage oxidizes components in the effluent from the first stage at a second temperature. Advantageously, the first stage comprising the first catalyst operates at a temperature lower than the second stage comprising the second catalyst. The various embodiments depicted in FIGS. 2-5 may reduce start-up time due to a lower thermal mass. It is to be understood that the CATOX apparatus and process may have a third, fourth, or additional stages. Therefore, modifications of FIGS. 1-5 may be contemplated as being within the scope of the present invention.

For example, the first catalyst in catalytic reactor 110 may be the same or different from the second catalyst in catalytic reactor 126. A first portion of catalyzed recuperator 150, shown in FIGS. 3 and 5, may be not comprise a catalyst and be configured to heat the ambient air before contacting a second portion of catalyzed recuperator 150, comprising the second catalyst. Additionally, PTF 130 may not be required as air suitable for use or breathing may exit second catalytic reactor 126. Additionally, any of the process steps or process elements disclosed in U.S. patent application Ser. No. 11/736,069, incorporated herein in its entirety, may be incorporated into aspects of the instant disclosure. Further, reduction of startup time may achieved by introducing one or more educators, utilizing the venturi effect drawing air from a low pressure towards a high pressure, into the CATOX assembly.

Figure 6:
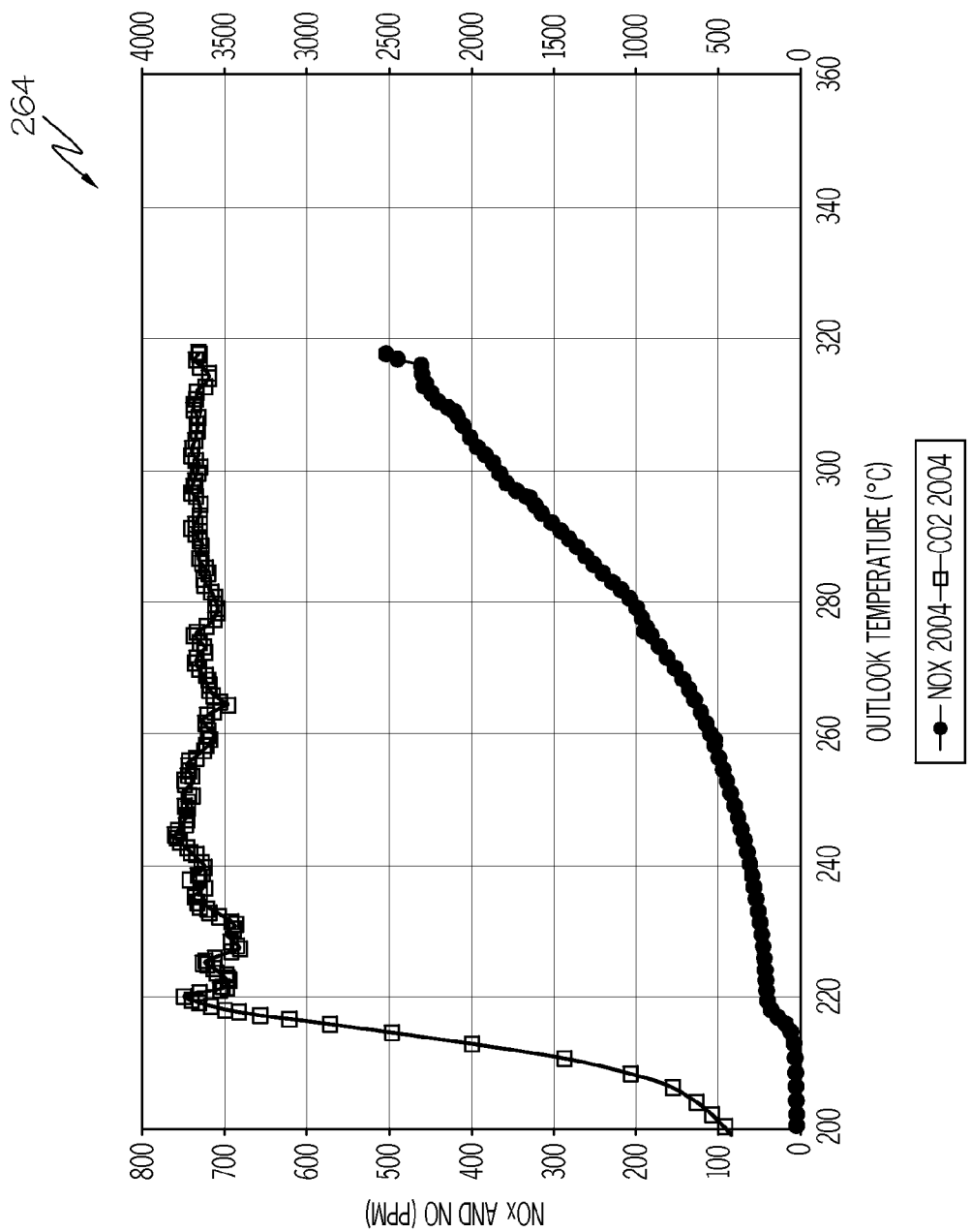
FIG. 6 is a graph showing the relationship between catalyst outlet temperature and reactor effluent of an embodiment of a catalyst.

Referring now to FIG. 6, there is shown a graph 264 describing the relationship between catalyst outlet temperature and reactor effluent. The data shown in this graph 264 was obtained from an experiment wherein an admixture of 1,800 parts per million by volume (ppm) of acetonitrile ($CH_3CN$) in air was charged to a catalytic reactor as the temperature was changed. The $CO_2$ reactor effluent (ppm) and the $NO_x$ and NO effluent (ppm) were measured as a function of outlet temperature.

The carbon dioxide generated shows that the point of high conversion was obtained at a reactor temperature above about 220° C. In other words, increasing the temperature beyond about 220° C. did not increase the carbon dioxide effluent. Therefore, it can be assumed that a high level of conversion but not necessarily >99.9999% of acetonitrile to carbon dioxide was obtained at a temperature of at least about 220° C. At this temperature (220° C.), only about 40 ppm of $NO_x$ was produced. The remaining nitrogen in the acetonitrile was converted to less toxic materials, such as nitrogen gas ($N_2$) and nitrous oxide ($N_2O$). It is much more desirable to have these materials, rather than $NO_x$, present in the breathable air.

Several toxic compounds that the CATOX system is required to treat may require a higher temperature for catalytic oxidation. For this reason, the catalyst must be operated at a higher temperature. However, based on laboratory data of FIG. 5, at about 300° C. (a temperature suitable for the conversion of a broad spectrum of toxicants), approximately 370 ppm of $NO_x$ was produced. By utilizing the two-stage apparatus and methods of the present invention, a first catalytic reaction may be conducted at 220° C., producing about 40 ppm $NO_x$. As discussed above, this catalytic reaction destroyed essentially all of the acetonitrile present in the air stream. A second catalytic reaction may be conducted at 300° C. to remove other compounds that do not contain nitrogen and are less reactive at lower temperatures. In this second catalytic reaction, little or no $NO_x$ may be generated because the acetonitrile was destroyed in the first step at 220° C. The result may be effective catalytic oxidation at 300° C. without the associated $NO_x$ production (which would be about 370 ppm, a 9-fold increase from the two stage process production of 40 ppm).

Referring to FIG. 7, there is shown a flow chart describing a method 266 for producing a purified air flow according to one embodiment of the present invention. Broadly, the method 266 may include a first step 268 of introducing ambient air to a lower temperature catalytic reactor (e.g., lower temperature catalytic reactor 110 or 150 comprising a first catalytic composition) at a first temperature. The second step 272 comprises passing the effluent from step 268 through a higher temperature catalytic reactor (e.g., higher temperature catalytic reactor 126 or 160 comprising a second catalytic composition). The method 266 may include an optional step 270 of filtering the effluent from step 268 through a post treatment filter (e.g., post treatment filter 130). Furthermore, method 266 may include an optional step 274 of cooling the cleaned air with a cooling air heat exchanger (e.g., cooling air heat exchanger 12, 104 or 150). The cooling air heat exchanger may have, as a cooling source, ambient air or a liquid cooled by, for example, a vapor cycle system as disclosed in U.S. patent application Ser. No. 11/736,069.

Referring to FIG. 8, there is shown an example of a catalytic heat exchanger 500. Catalytic heat exchanger is a cross-flow, shell and tube heat exchanger having a catalytic compound 314 on the outer surface of tubes 316. Catalytic compound 314 may be comprised of the first or second catalyst of catalytic reactors 150 and 160 and may be wash coated on the outer surface of tubes 316 or adhered to the outer surface by other means as are known in the art. Inlet 301 may provide a gas to be treated which flows through housing 310 and about the outer surfaces of tubes 316 having catalytic compound 314 where a portion of the contaminants in ambient air 102 are oxidized. A heated fluid or fuel may be passed through the inside of tubes 316 where it may transfer heat and/or combust, heating catalytic compound 314. Heated fluid 302 may be the effluent from the second catalytic reactor or PTF 130. The gas to be treated flowing into catalytic heat exchanger 500 at inlet 301 may be ambient air or the effluent of a prior stage of a CATOX system. Treated air 318 may flow out of the catalytic heat exchanger 500. It is to be understood that catalytic heat exchanger 500 is but one example of an embodiment of the present disclosure. For example, a catalytic heat exchanger may have a current or counter flow design. The catalytic heat exchanger may be heated electrically, for example, a plurality of rods comprised of a catalyst may be heated with the flow of electricity therethrough.

It should be understood, of course, that the foregoing relates to exemplary embodiments of the invention and that modifications may be made without departing from the spirit and scope of the invention as set forth in the following claims.

We claim:

1. A method for producing a purified air flow from ambient air that contains nitrogen-containing toxicants, the method comprising:

heating an incoming flow of the ambient air with a first heat exchanger to produce a heated ambient air, the first heat exchanger being a plate cross-flow heat exchanger;

contacting the heated ambient air, at a first temperature between about 200° C. to about 300° C., with a first catalyst;

converting a first portion of the nitrogen-containing toxicants in the heated ambient air with said first catalyst to provide a heated first effluent within which greater than 50% of the nitrogen-containing toxicants have been converted to nitrogen gas and nitrous oxide;

contacting the heated first effluent, at a second temperature above 300° C., with a second catalyst, wherein the second catalyst is the same or different from the first catalyst;

oxidizing a second portion of the nitrogen-containing toxicants in the heated first effluent with said second catalyst to provide a second effluent;

removing acid gas and nitrogen-containing compounds in said second effluent with a post treatment filter to produce a third effluent;

cycling the third effluent to the first heat exchanger;

exchanging heat between the third effluent and the incoming flow of ambient air; and discharging the third effluent from the first heat exchanger.

2. The method of claim 1 wherein converting said first portion of the toxicants comprises converting at least 90% of said nitrogen-containing toxicants into nitrogen gas and nitrous oxide.

3. The method of claim 1 wherein said first catalyst converts nitrogen-containing toxicants at said first temperature to minimize a production of acid gas.

4. The method of claim 1, wherein the first catalyst is located in one of the first heat exchanger and a first catalytic reactor downstream of the first heat exchanger.

5. The method of claim 1, wherein:
heating the ambient air occurs in the first heat exchanger; and
contacting the heated ambient air occurs in a first catalytic reactor.

6. The method of claim 1, wherein heating the ambient air and contacting the heated ambient air both occur in the first heat exchanger.

\* \* \* \* \*